United States Patent
Day et al.

(10) Patent No.: US 9,272,781 B2
(45) Date of Patent: Mar. 1, 2016

(54) ROTOR SYSTEM ANTI-ROTATION WEAR PROTECTOR

(75) Inventors: Clifton B. Day, Weatherford, TX (US); Danny Spivey, Fort Worth, TX (US); Brian S. M. Modrzejewski, Keller, TX (US); Tim Stark, Arlington, TX (US); Farid Saiyed, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 754 days.

(21) Appl. No.: 13/286,836

(22) Filed: Nov. 1, 2011

(65) Prior Publication Data

US 2013/0105636 A1    May 2, 2013

(51) Int. Cl.
*B64C 27/32* (2006.01)
*B64C 27/605* (2006.01)

(52) U.S. Cl.
CPC .................................. *B64C 27/605* (2013.01)

(58) Field of Classification Search
CPC .... F16C 11/045; B64C 27/322; B64C 27/605
USPC .......................... 403/113, 149, 150, 157, 158; 244/17.25, 17.27
See application file for complete search history.

(56) References Cited

U.S. PATENT DOCUMENTS

| | | | |
|---|---|---|---|
| 4,072,431 A * | 2/1978 | Waight et al. ................. | 403/158 |
| 6,371,681 B1 | 4/2002 | Covington et al. | |
| 6,669,393 B2 * | 12/2003 | Schilling ......................... | 244/54 |
| 8,002,489 B2 * | 8/2011 | Mahy et al. .................... | 403/158 |
| 2010/0047010 A1 | 2/2010 | Halcom et al. | |

FOREIGN PATENT DOCUMENTS

CA    2676523 A1    8/2008

OTHER PUBLICATIONS

Extended European Search Report Application No. 11192679.6-1264, issued by the European Patent Office on Mar. 26, 2012.
Examination Report in related European patent application No. 11192679.6, mailed Nov. 27, 2013, 5 pages.
Examination Report in related Canadian patent application No. 2,795,238, mailed Nov. 26, 2013, 2 pages.
Office Action dated Jul. 18, 2014 from counterpart EP App. No. 11192679.6.
Office Action dated Oct. 20, 2014 from counterpart CA App. No. 2,795,238.
Office Action dated Nov. 4, 2014 from counterpart CN App. No. 2012104293426.
Office Action dated Jul. 9, 2015 from counterpart CA App. No. 2,795,238.

\* cited by examiner

*Primary Examiner* — Michael P Ferguson
(74) *Attorney, Agent, or Firm* — James E. Walton

(57) ABSTRACT

A rotating control system includes a member having at least one clevis defined by a pair of clevis arms disposed in a clevis plane, the at least one clevis having an axis of symmetry disposed in the clevis plane midway between the pair of clevis arms, a shaft member pivotally coupled between the pair of clevis arms, the shaft member having a shaft axis, the shaft axis disposed axially along the shaft member, and an anti-rotation device for limiting a rotation of the shaft member about the shaft axis, the anti-rotation device having a plurality of flanges configured to couple to the clevis arms of the member, the flanges extending from a surface of a base member, the anti-rotation device having at least one restraining member that protrudes toward the shaft member for limiting the axial rotation of the shaft member.

6 Claims, 9 Drawing Sheets

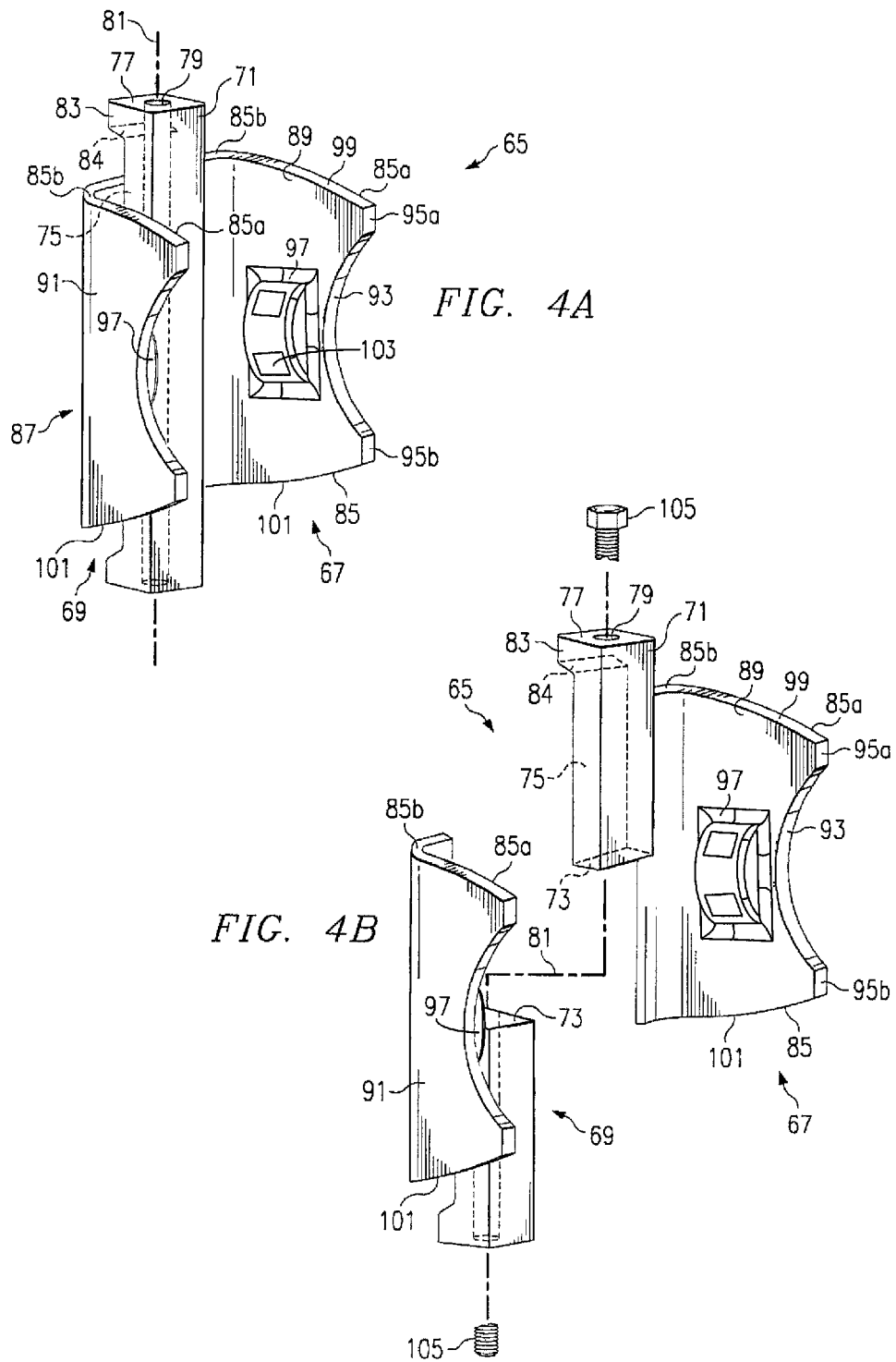

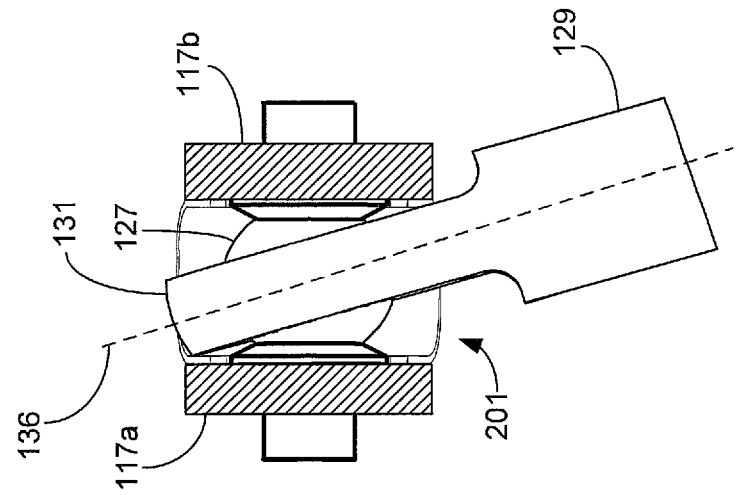
FIG. 6E
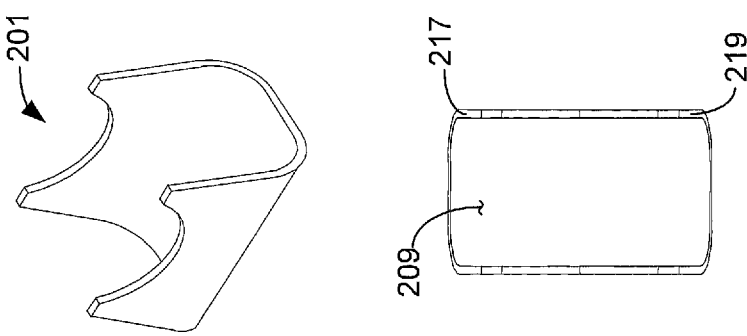
FIG. 6A
FIG. 6D
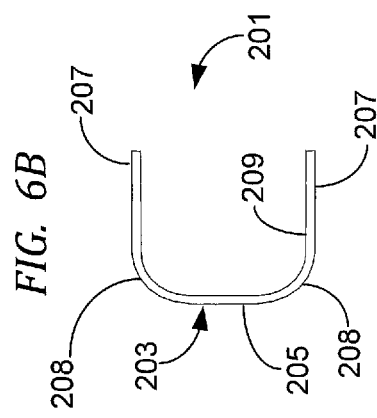
FIG. 6B
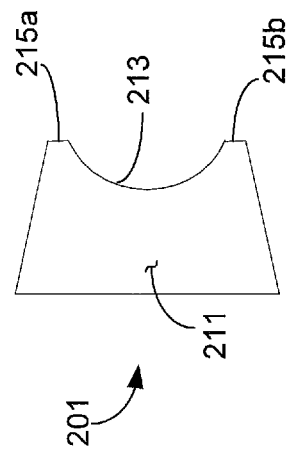
FIG. 6C

ROTOR SYSTEM ANTI-ROTATION WEAR PROTECTOR

BACKGROUND

1. Field of the Invention

The present application relates generally to anti-rotation devices used to prevent wear in the rotating control systems of helicopters and tilt rotor aircraft and, more particularly, to a method and apparatus for limiting the rotation of an actuator rod used to manipulate the non-rotating swashplate of a swashplate system.

2. Description of Related Art

Tilt rotor aircraft are hybrids between traditional helicopters and traditional propeller driven aircraft. Typical tilt rotor aircraft have fixed wings that terminate with convertible tilt rotor assemblies that house the engines and transmissions that drive the rotors. Tilt rotor aircraft are convertible from a helicopter mode, in which the tilt rotor aircraft can take-off, hover, and land like a helicopter; to an airplane mode, in which the tilt rotor aircraft can fly forward like a fixed-wing aircraft.

Helicopters and tilt rotor aircraft use rotating control systems. A rotating control system typically consists of a rotating swashplate and a non-rotating swashplate connected by a bearing system. The rotating swashplate tracks the movements of the non-rotating swashplate, and the angle of the main rotor blades are adjusted accordingly. The non-rotating swashplate is manipulated by the pilot by way of hydraulic actuators. Each actuator rod is attached to one of several clevises of the non-rotating swashplate at a spherical bearing. The spherical bearing is held in place by a bearing housing at the end of the actuator rod.

The spherical bearing permits rotational misalignment of the actuator in all axes. The misalignment of the spherical bearing is determined and controlled by inputs from the flight control system. Rotation of the actuator about its own longitudinal axis is not restricted, nor can it be limited or controlled by inputs from the flight control system. Because of this condition, the bearing housing is able to rotate within the clevis such that it comes into contact with an inner surface of the clevis. Such contact causes wear resulting in structural damage to both the clevis arms and the bearing housing. Since the clevis arms are integral to the non-rotating swashplate, damage to the clevis arms compromises the structural integrity of the non-rotating swashplate. Damage to the non-rotating swashplate causes a hazardous condition that could cause a pilot to loose control of the helicopter or aircraft. Devices have been inserted into the clevis to limit excessive rotation of the actuator. Such devices have caused premature wear and damage to the bearing housings from the introduction of debris, thereby compromising the structural integrity of the actuator.

Due to the flight-critical nature of the non-rotating swashplate and actuator, there has been a desire to minimize wear and damage to the clevis arms and bearing housing. The solution to the problem in the past has been to install wear pads between the bearing housing and the clevis arms. This approach does protect the clevis but does not protect the bearing housing, which is worn because of contact with the pads. An additional problem is that the wear pads may require frequent replacement, resulting in added costs and aircraft down time.

Although great strides have been made in anti-rotation devices, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 4A is an assembled perspective view of the anti-rotation device as seen in FIG. 3;

FIG. 4B is an exploded perspective view of the anti-rotation device of FIG. 4A;

FIG. 6A is a perspective view of an alternate embodiment of the anti-rotation device of FIG. 4A;

FIG. 6B is a top view of the anti-rotation clip device of FIG. 6A;

FIG. 6C is a side view of the anti-rotation device of FIG. 6A;

FIG. 6D is a front view of the anti-rotation clip of FIG. 6A;

FIG. 6E is a front view of the anti-rotation clip of FIG. 6A installed in the clevis of FIG. 5A;

Figure 1:
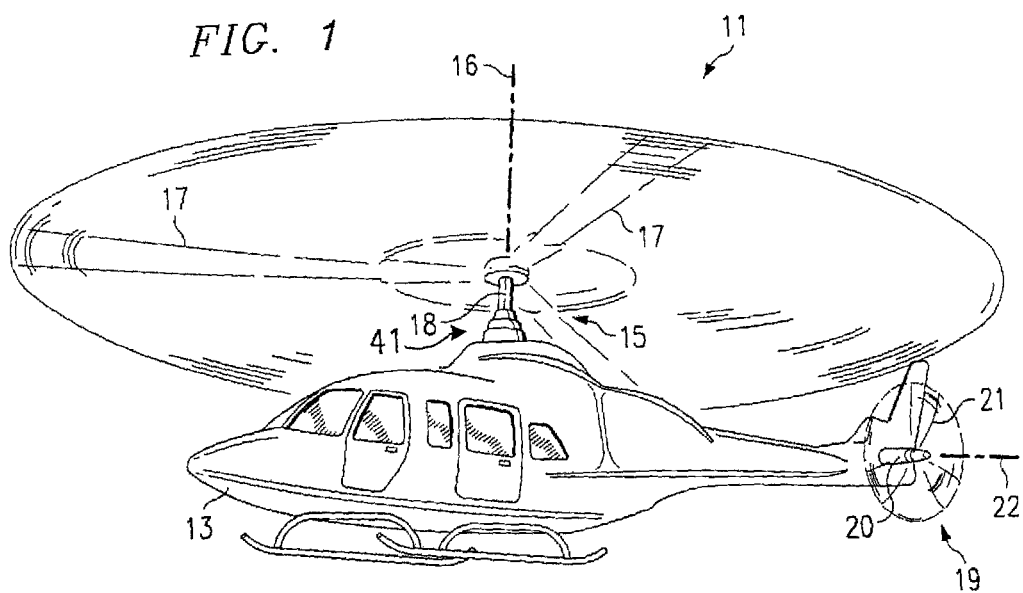
FIG. 1 is a perspective view of a helicopter implementing an anti-rotation device according to the present invention.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1 in the drawings, a helicopter 11 having an anti-rotation device for use with a swashplate system 41 is illustrated. Helicopter 11 has an airframe 13, a main rotor assembly 15 including main rotor blades 17 and a main rotor shaft 18, and a tail rotor assembly 19 including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 can take-off, hover, rotate, fly with a designated heading, and land. Helicopter 11 includes an anti-rotation device 12, according to the present application, for use in conjunction with swashplate system 41. Although hidden from view in FIG. 1, it is understood that anti-rotation device 12 and swashplate system 41 are located generally with respect to helicopter 11.

Figure 2A:
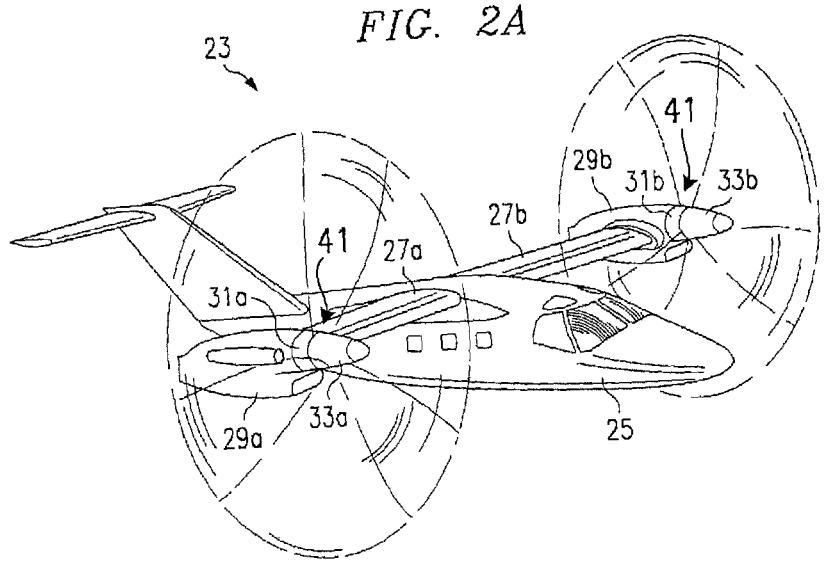
FIG. 2A is a perspective view of a tilt rotor aircraft in an airplane mode implementing the anti-rotation device according to the present invention.
Figure 2B:
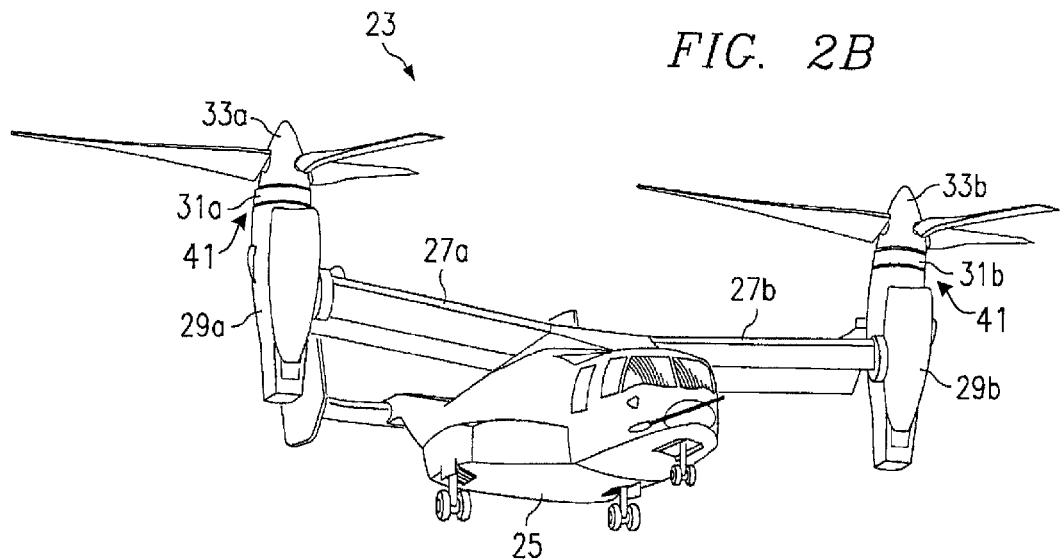
FIG. 2B is a perspective view of a tilt rotor aircraft in a helicopter mode implementing the anti-rotation device according to the present invention.

Referring now to FIGS. 2A and 2B in the drawings, a tilt rotor aircraft 23, able to perform similar functions to that of helicopter 11, is illustrated. Tilt rotor aircraft 23 has an airframe 25 and wings 27a and 27b coupled to airframe 25. As is conventional, wings 27a and 27b terminate with tilt rotor assemblies 29a and 29b, respectively. Tilt rotor assemblies 29a and 29b each generally include an engine, a transmission and gear box for driving rotor shafts 31a and 31b and prop-rotors 33a and 33b, and a conversion actuator for actuating tilt rotor assemblies 29a and 29b between an airplane mode, as illustrated in FIG. 2A, and a helicopter mode, as illustrated in FIG. 2B. In the airplane mode, tilt rotor aircraft 23 can be flown and operated like a conventional fixed-wing propeller driven aircraft. In the helicopter mode, tilt rotor aircraft 23 can take-off, hover, land, and be operated like a conventional rotary wing aircraft or helicopter. Tilt rotor aircraft 23 includes anti-rotation device 12 according to the present application for use in conjunction with swashplate system 41. Although hidden from view in FIG. 1, it is understood that anti-rotation device 12 and swashplate system 41 are located generally with respect to tilt rotor aircraft 23.

Figure 3:
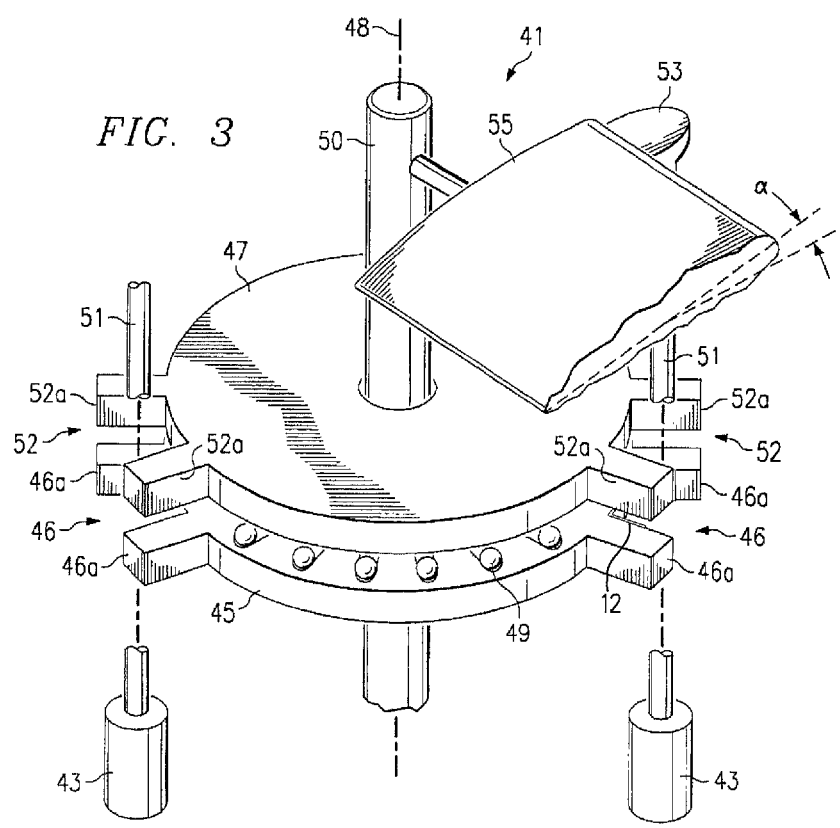
FIG. 3 is a perspective view of a rotating control system used on the helicopter of FIG. 1 and the tilt rotor aircraft of FIGS. 2A and 2B having a rotating swashplate and a non-rotating swashplate, both swashplates having a plurality of clevises, the rotating control system having an anti-rotation device.

Referring now to FIG. 3 in the drawings, a rotating control system, or swashplate system 41, for use in both helicopter 11 and tilt rotor aircraft 23 is illustrated. Swashplate system 41 can be either of original manufacture or an existing swashplate system that is being used on an aircraft. Although swashplate system 41 design varies, swashplate system 41 uses at least one hydraulic actuator 43 to manipulate a non-rotating swashplate 45. Non-rotating swashplate 45 includes a plurality of clevises 46, each clevis 46 formed by a pair of clevis arms 46a. Clevis arms 46a are adapted to pivotally receive hydraulic actuator 43. The position of hydraulic actuator 43 is determined by a pilot input during typical flight maneuvers. As hydraulic actuator 43 pivotally operates within clevis arms 46a, hydraulic actuator 43 is susceptible to contacting a portion of non-rotating swashplate 45. The contact can cause premature wear to non-rotating swashplate 45 and/or hydraulic actuator 43. Swashplate system 41 uses at least one anti-rotation device 12 to limit the rotational freedom of hydraulic actuator 43 in clevis 46a, 46b without limiting misalignment capability of hydraulic actuator 43. Contact and premature wear between hydraulic actuator 43 and non-rotating swashplate 45 is prevented.

Non-rotating swashplate 45 is free to rotate about any horizontal, in-plane axis that intersects a longitudinal axis 48 of rotor shaft 50, whereby rotor shaft 50 is similar to main rotor shaft 18 (FIG. 1), tail rotor shaft 20 (FIG. 1), and rotor shafts 31a and 31b (FIGS. 2A and 2B). Such rotation will be referred to herein as "out-of-plane" rotation. Hydraulic actuator 43 causes non-rotating swashplate 45 to experience out-of-plane rotation, which causes a rotating swashplate 47 to experience the same out-of-plane rotation. Rotating swashplate 47 is also free to rotate in a plane parallel to non-rotating swashplate 45 about longitudinal axis 48. Such rotation shall be referred to herein as "in-plane" rotation. A bearing system 49 is disposed between rotating swashplate 47 and non-rotating swashplate 45.

Rotating swashplate 47 includes a plurality of clevises 52, each clevis 52 formed by a pair of clevis arms 52a. Clevis arms 52a are adapted to pivotally receive a pitch link 51 for each of a plurality of main rotor blades 55.

As non-rotating swashplate 45 is actuated, non-rotating swashplate 45 and rotating swashplate 47 experience out-of-plane rotation. The out-of-plane rotation by rotating swashplate 47 manipulates pitch link 51 connected to a pitch horn 53 for each of a plurality of main rotor blades 55. Pitch horn 53 extends or retracts based on the out-of-plane rotation of rotating swashplate 47, thereby adjusting an angle α of main rotor blade 55.

Referring now to FIGS. 4A and 4B in the drawings, the preferred embodiment of a clip 65 according to the present invention is illustrated. Clip 65 is one of many embodiments of anti-rotation device 12. Clip 65 is a multipart device having at least a top, or first portion 67 and a bottom, or second portion 69. Hereinafter, it should be understood that top portion 67 is identical in form and function to bottom portion 69. In the preferred embodiment, top portion 67 and bottom portion 69 are made from a plastic having good wear resistance, such as Nylatron. Nylatron refers to a family of plastics typically filled with molybdenum disulfide lubricant powder. However, the material composition of anti-rotation clip 65 could be any wear resistant material. Restraining member 97 is chosen such that the material of restraining member 97 is softer than the material used in hydraulic actuator 43 so as to promote wear on restraining member 97 rather than hydraulic actuator 43.

Top portion 67 includes a generally rectangular center channel 71 having a bottom surface 73, a rear surface 75, and a top surface 77. Bottom surface 73 of center channel 71 of top portion 67 is adapted to mate with the corresponding bottom surface 73 of center channel 71 of bottom portion 69. Center channel 71 includes a longitudinally extending aperture 79 that extends from top surface 77 to bottom surface 73 along a longitudinal axis 81.

A flange 83 extends rearward from rear surface 75 of center channel 71. Flange 83 includes a lower flange surface 84 that is generally tapered toward top surface 77 as lower flange surface 84 extends rearwardly from center channel 71.

Top portion 67 also includes a side member 85. Side member 85 includes a planar portion 85a that is generally perpendicular to rear surface 75. Side member 85 also includes a generally rounded corner portion 85b that is integrated with planar portion 85a. Corner portion 85b is integrated with and flushly connected to rear surface 75. Although planar portion 85a is shown to be generally perpendicular to rear surface 75, it should be understood that planar portion 85a may form angles other than right angles with rear surface 75 depending on the angle of the clevis into which clip 65 is installed, as will be explained in more detail below.

Planar portion 85a includes an arcuate cutout 93 forming legs 95a and 95b, leg 95a having an upper leg surface 99 and leg 95b having a lower leg surface 101. Upper leg surface 99 and lower leg surface 101 taper toward one another as planar portion 85a extends outward from corner portion 85b.

When top portion 67 and bottom portion 69 are combined, a wall portion 87 is formed that is made up of both center channels 71 and both side members 85. Wall portion 87 includes an inner surface 89 and an opposing outer surface 91. Inner surface 89 includes a restraining member 97 that protrudes inwardly from inner surface 89 and perpendicular to axis of symmetry 135 (see FIG. 5A), thereby forming a relatively smooth and continuous bulbous portion. Restraining member 97 extends parallel to longitudinal axis 81, rather than perpendicular. Restraining member 97 includes a broad width between wall portion 87 and arcuate cutout 93. The width may vary.

Restraining member 97 is configured to increase the surface contact with hydraulic actuator 43 to minimize potential wear to hydraulic actuator 43. Restraining member 97 is generally rectangular in cross section, although this shape could vary according to the application in which the apparatus is used. It is understood that restraining member 97 is not limited in size or shape to that depicted in the drawings. Restraining member 97 may extend as one continuous arc from upper leg surface 99 to lower leg surface 101. Furthermore, it is understood that one or more restraining members 97 may be used on each portion 67, 69. The location of restraining member 97 is selected in order to most effectively limit the rotational freedom of hydraulic actuator 43 without limiting misalignment capability of hydraulic actuator 43.

Restraining member 97 is integrally formed within portion 67, 69. Other embodiments may configure restraining members 97 to releasably couple to portions 67, 69 so as to permit removal. Furthermore, such a method of removal allows portions 67, 69 to remain secured within swashplate system 41 during removal of restraining member 97.

Referring specifically to FIG. 4B in the drawings, the method of joining top portion 67 and bottom portion 69 is illustrated. Bottom surfaces 73 of each center channel 71 are adapted to mate with the other. A connecting member 105 passes through apertures 79 to releasably join top portion 67 and bottom portion 69. The use of a multipart clip 65 allows clip 65 to be easily installed during original installation and easily replaced during periodic maintenance periods.

An interfacing surface 103 is illustrated on restraining member 97 (FIGS. 4A and 4B) to represent the approximate contact area between hydraulic actuator 43 and restraining member 97 when hydraulic actuator 43 is at a maximum misalignment angle. The contour and shape of restraining member 97 is optimized to provide the largest interfacing surface 103 as possible across the range of orientations of hydraulic actuator 43. It is understood that interfacing surface 103 is representative only. Any portion of restraining member 97 may contact hydraulic actuator 43. The broad profile of restraining member 97 is configured to avoid localized wearing of hydraulic actuator 43 from the introduction of foreign abrasive matter and grease collecting at interfacing surfaces 103.

Figure 5A:
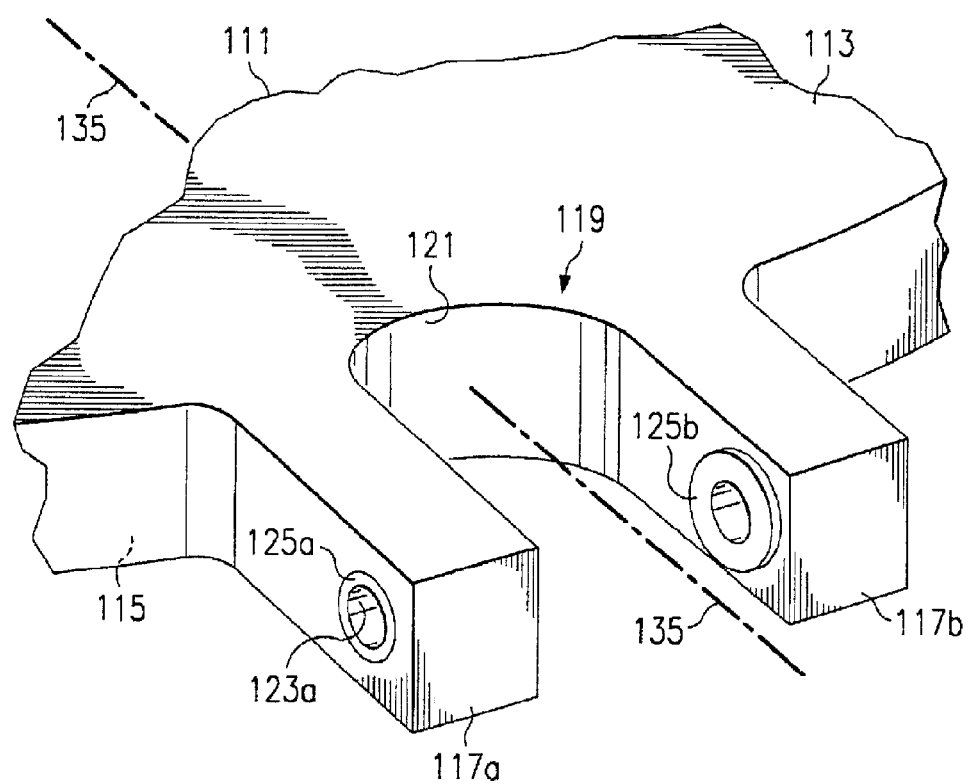
FIG. 5A is an enlarged perspective view of one of the clevises located on the non-rotating swashplate of FIG. 3.
Figure 5B:
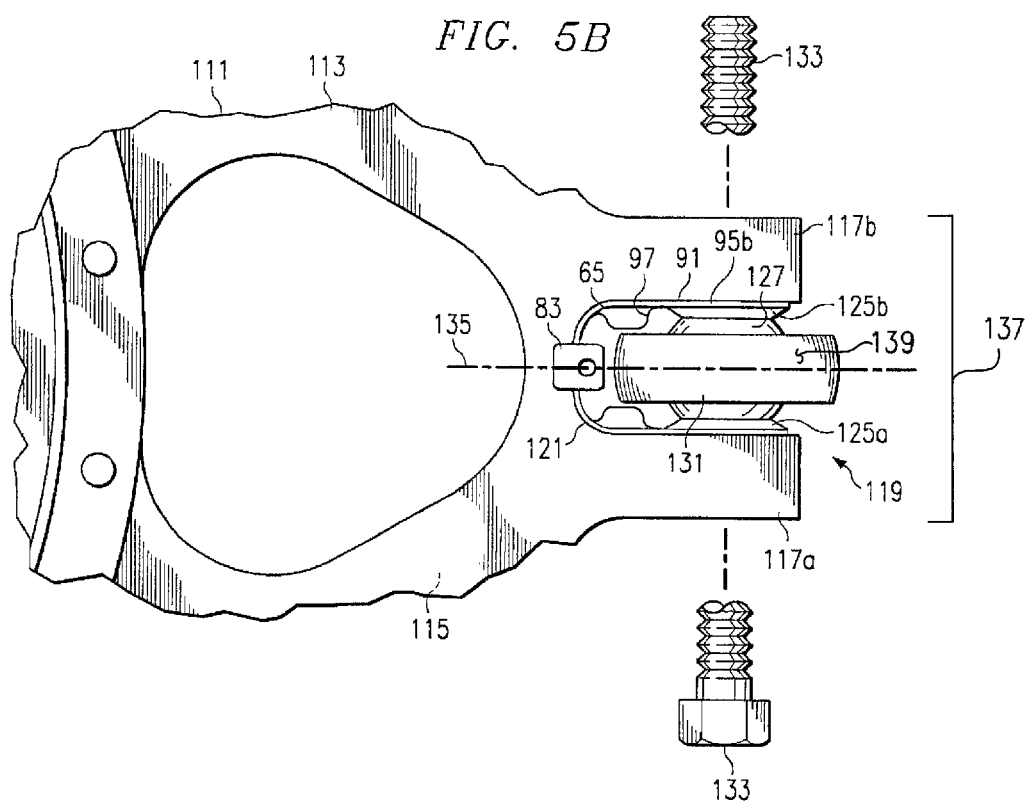
FIG. 5B is an assembled top view of the anti-rotation device of FIG. 4A installed in the clevis of FIG. 5A.
Figure 5C:
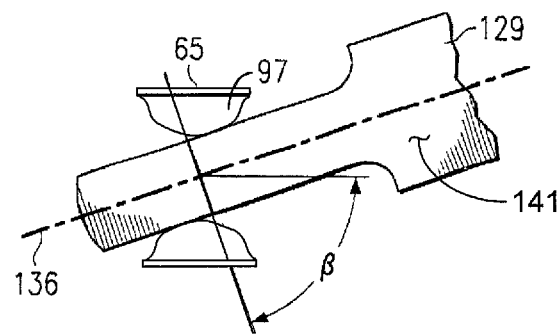
FIG. 5C is a partial side view of the assembled anti-rotation device of FIG. 5B showing how the anti-rotation device allows rotation of an actuator rod about some axes while limiting rotation about other axes.

Referring now to FIGS. 5A, 5B, and 5C in the drawings, the assembly containing the preferred embodiment of the present invention is illustrated. FIGS. 5A and 5B illustrate a non-rotating swashplate 111 having an upper surface 113 and a lower surface 115. Swashplate 111 is similar to non-rotating swashplate 45. Non-rotating swashplate 111 also includes clevis arms 117a and 117b which are preferably parallel and form a typically U-shaped clevis 119. Although clevis arms 117a and 117b are shown as being parallel, it is not necessary that clevis arms 117a and 117b be parallel. However, it is preferred that clevis arms 117a and 117b extend outward from non-rotating swashplate 111 in a common clevis plane. An axis of symmetry 135 is disposed in the clevis plane between clevis arms 117a and 117b.

Non-rotating swashplate 111 includes a clevis 119 for each rotor blade 55 (see FIG. 3). Clevis 119 includes an inner surface 121. Clevis arm 117a includes an aperture 123a passing therethrough that is aligned with a corresponding aperture (not shown) passing through clevis arm 117b. Aperture 123a and the corresponding aperture through clevis arm 117b contain conventional bushings 125a and 125b which are adapted to engage a conventional spherical bearing 127 at the end of an actuator rod 129. Spherical bearing 127 allows rotational misalignment of actuator rod 129 in all axes. Spherical bearing 127 is radially constrained by a bearing housing 131 located at the end of actuator rod 129. A connecting pin 133 passes through aperture 123a, spherical bearing 127, and the corresponding aperture through clevis arm 117b, thereby pivotally attaching actuator rod 129 to non-rotating swashplate 111.

Clip 65 is installed between clevis arms 117a and 117b. As explained previously, outer surface 91 of clip 65 is adapted to mate with inner surface 121 of clevis 119 by the use of an adhesive, such as a silicone adhesive. Legs 95a and 95b are adapted to concentrically surround bushings 125a and 125b. Lower flange surfaces 84 of flanges 83 of clip 65 are adapted to mate with upper surface 113 and lower surface 115 of non-rotating swashplate 111. Flanges 83 can be adapted to prevent translation of clip 65 along longitudinal axis 81. However, this is not a necessary feature of flanges 83.

Referring specifically to FIGS. 5B and 5C in the drawings, the primary function of the present invention is illustrated. As is shown, anti-rotation clip 65 is installed in clevis 119 of non-rotating swashplate 111. Actuator rod 129, part of hydraulic actuator 43, that includes spherical bearing 127 and bearing housing 131, is fastened between clevis arms 117a and 117b. Actuator rod 129 defines a rod axis 136 which extends axially along actuator rod 129. Upon input from the pilot, actuator rod 129 extends or retracts which causes out-of-plane rotation of non-rotating swashplate 111. Although out-of-plane rotation is needed to control the aircraft, excessive rotation of actuator rod 129 about rod axis 136 is not desired because the rotation about rod axis 136 causes bearing housing 131 to impact inner surface 121 of clevis 119 causing wear and structural damage to both bearing housing 131 and clevis 119 of non-rotating swashplate 111. Axis of symmetry 135 shown in FIG. 5B intersects rod axis 136 and is perpendicular to the view shown in FIG. 5C.

The primary function of clip 65 is to limit the rotation of actuator rod 129 about rod axis 136, thereby eliminating or substantially reducing wear and structural damage. Restraining members 97 limit the rotation of actuator rod 129 about rod axis 136, while allowing actuator rod 129 to rotate about axis of symmetry 135. As shown in FIG. 5C, restraining members 97 allow actuator rod 129 to rotate about axis of symmetry 135 up to an angle β. This rotation is necessary for proper manipulation of non-rotating swashplate 111, but the limitation of rotation about rod axis 136 prevents bearing housing 131 from impacting non-rotating swashplate 111. Angle β varies according to the overall control system design. As seen in FIG. 5C, bearing housing 131 may contact both restraining members 97 simultaneously.

Referring now to FIGS. 6A-6D in the drawings, an alternate embodiment of the present application is illustrated. Clip 201 is another embodiment of anti-rotation device 12. More particularly, clip 201 is similar in form and function to that of clip 65, except as noted herein. Unlike the preferred embodiment, clip 201 is made of unitary construction. Furthermore, clip 201 does not include the use of center channel 71 or restraining member 97. Clip 201 is preferably made from Nylatron. However, the material composition of clip 201 could be any wear resistant material.

Clip 201 is made of unitary construction unlike clip 65. Clip 201 is formed of a single body 203 made up of a back member 205 and a plurality of side members 207. Back member 205 and side members 207 are integrally coupled together by a generally rounded corner portion 208 that is integrated with and flushly connected to side member 207 and back member 205. As a whole, body 203 includes an inner surface 209 and an opposing outer surface 211. Side member 207 is generally perpendicular to back member 205. Although side member 207 is shown to be generally perpendicular to back member 205, it should be understood that side member 207 may form angles other than right angles with back member 205 depending on the angle of the clevis into which clip 201 is installed, as will be explained in more detail below.

Side member 207 includes an arcuate cutout 213 forming legs 215a and 215b, leg 215a having an upper leg surface 217 and leg 215b having a lower leg surface 219. Upper leg surface 217 and lower leg surface 219 taper toward one another as side member 207 extends outward from corner portion 208.

Clip 201 is installed between clevis arms 117a and 117b. As explained previously, outer surface 211 of clip 201 is adapted to mate with inner surface 121 of clevis 119, as seen in FIG. 5A, by the use of an adhesive, such as a silicone adhesive. Legs 215a and 215b are adapted to concentrically surround bushings 125a and 125b.

Referring now to FIG. 6E in the drawings, the primary function of clip 201 is illustrated. As is shown, clip 201 is installed in clevis 119 of non-rotating swashplate 111 as seen in FIG. 5A. Actuator rod 129, which includes spherical bearing 127 and bearing housing 131, is fastened between clevis arms 117a and 117b. Actuator rod 129 defines a rod axis 136 which extends axially along actuator rod 129. Upon input from the pilot, actuator rod 129 extends or retracts which causes out-of-plane rotation of non-rotating swashplate 111. Although out-of-plane rotation is needed to control the aircraft, excessive rotation of actuator rod 129 about rod axis 136 is not desired because the rotation about rod axis 136 causes bearing housing 131 to impact inner surface 121 of clevis 119 causing wear and structural damage to both bearing housing 131 and clevis 119 of non-rotating swashplate 111. Axis of symmetry 135 shown in FIG. 5B intersects rod axis 136 and is perpendicular to the view shown in FIG. 6E.

The primary function of clip 201 is to eliminate or substantially reduce wear and structural damage due to the impact of bearing housing 131 and inner surface 121 of clevis 119. Horse shoe insert 201 provides a barrier of protection around inner surface 121 of clevis 119. Actuator rod 129 is allowed to rotate about axis of symmetry 135 and rod axis 136. As shown in FIG. 5C, actuator rod 129 is allowed to rotate about axis of symmetry 135 up to angle β. This rotation is necessary for proper manipulation of non-rotating swashplate 111, but the barrier of protection provided by clip 201 prevents bearing housing 131 from impacting non-rotating swashplate 111. Angle β varies according to the overall control system design.

Referring now also to FIGS. 7A-7E in the drawings, an alternate embodiment of the present application is illustrated. A clip 301 is another embodiment of anti-rotation device 12. Clip 301 is preferably made from Nylatron. However, the material composition of clip 301 could be any wear resistant material. Clip 301 has the same purposes, limitations, functions and features of the previous embodiments, therefore all such purposes, limitations, functions and features are incorporated herein except as described below. Clip 301 can be easily installed during original installation and easily replaced during periodic maintenance periods.

Clip 301 may be manufactured as a unitary or multi-piece clip. Clip 301 is depicted as having two support members 303. When clip 301 is a multi-piece clip, each support member 303 is configured to have the same functions, features, and limitations. Clip 301 is configured to wrap around an upper portion of actuator rod 129 and extend one or more restraining members 305 toward and along bearing housing 131, below spherical bearing 127. Rod axis 136 of actuator rod 129 extends axially along actuator rod 129, as seen in FIGS. 5C and 6E. Upon input from the pilot, actuator rod 129 extends or retracts which causes out-of-plane rotation of non-rotating swashplate 111. Although out-of-plane rotation is needed to control the aircraft, excessive rotation of actuator rod 129 about rod axis 136 is not desired because the rotation about rod axis 136 causes bearing housing 131 to impact inner surface 121 of clevis 119 causing wear and structural damage to both bearing housing 131 and clevis 119 of non-rotating swashplate 111. Axis of symmetry 135 shown in FIG. 5B intersects rod axis 136 and is perpendicular to the view shown in FIG. 6E.

Support member 303 has a band 307, a neck 313, and restraining member 305. Band 307 is formed in a relatively semi-circular shape having at least two ends. At each end is an aperture 309. Aperture 309 defines an axis 306. Aperture 309 is configured to accept a fastener 311 along axis 306. Clip 301 includes fastener 311 to secure a plurality of support members 303 around actuator rod 129, by interference fit when fasteners 311 are tightened.

Each support member 303 is configured to align with an adjacent support member 303 along axis 306. Bands 307 contact and mate with an upper portion of actuator rod 129. Bands 307 of each support member 303 are coupled together with fasteners 311. When coupled together, bands 307 of clip 301 form a relatively circular shape that defines an axis 312. Axis 312 is configured to concentrically align with rod axis 136. Support members 303 define a plane 315 along a top surface 310.

In this embodiment, not all portions of band 307 are configured to mate with actuator rod 129 and bearing housing 131. Band 307 has a notch 314 with a notch surface 316. Notch 314 extends internally from an inner surface 308 of band 307. The distance which notch 314 extends within band 307 is dependent on the size and shape of actuator rod 129. When clip 301 is fastened together, notch surface 316 on each support member 303 presses against actuator rod 129. Notch surface 316 is shaped so as to accept actuator rod 129. Other portions of band 307 are not directly configured to mate with actuator rod 129. However, other embodiments may create one or more notches around band 307 to provide multiple mating locations to actuator rod 129.

Restraining member 305 is coupled to band 307 by neck 313. Neck 313 is an elongated material integrally coupled to restraining member 305. Likewise, band 307 is integrally coupled to neck 313, thereby forming a single member, support member 303. Neck 313 extends a distance horizontally toward axis 312 from top surface 310 and inner surface 308 of band 307. In the present embodiment, neck 313 extends over and helps to define notch 314. Neck 313 then extends upward perpendicular from plane 315 and parallel to axis 312.

Restraining member 305 is located along neck 313 furthest from plane 315. Restraining member 305 is wedge shaped having an internal surface 319, a top surface 317, and a back surface 321. Internal surface 319 is configured to extend parallel to and contact a portion of bearing housing 131. Although depicted as being vertical and flat, internal surface 319 may be shaped and contoured to match bearing housing 131. Top surface 317 is configured to match the contour of spherical bearing 127, as seen in FIG. 5B. Top surface 317 forms a concaved shape for acceptance of spherical bearing 127. Restraining member 305 is configured to rest in relative close proximity to spherical bearing 127. It is understood that contact between spherical bearing 127 and restraining member 305 is not necessary but may be desired in some embodiments. Back surface 321 also has a concaved shape, much like top surface 317. Back surface is contoured and shaped for acceptance of bushings 125a and 125b.

Clip 301 is configured to couple to actuator rod 129 and bearing housing 131. Selected portions of clip 301 are adapted to mate with actuator rod 129 and bearing housing 131. Namely, notch surface 316 and internal surface 319 are adhesively bonded to actuator rod 129 and bearing housing 131 by the use of an adhesive, such as a silicone adhesive. The rest of band 307 may come in contact with actuator rod 129 when tightening fasteners 311. It is understood that clip 301 may be configured and shaped in a multitude of ways thereby allowing more or less portions of clip 301 to mate with actuator rod 129 and bearing housing 131 than described.

Figures 7A, 7B:
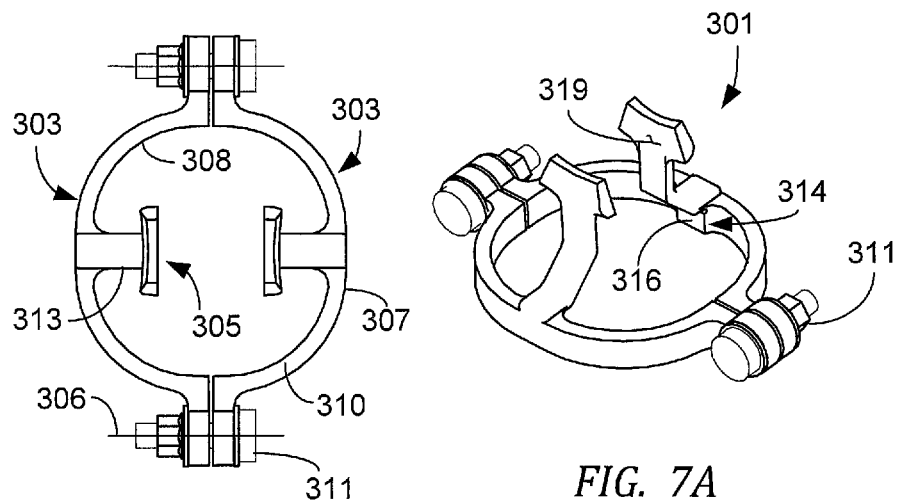
FIG. 7A is a perspective view of an alternate embodiment of the anti-rotation device of FIG. 4A.
FIG. 7B is a top view of the anti-rotation clip device of FIG. 7A.
Figures 7C, 7D:
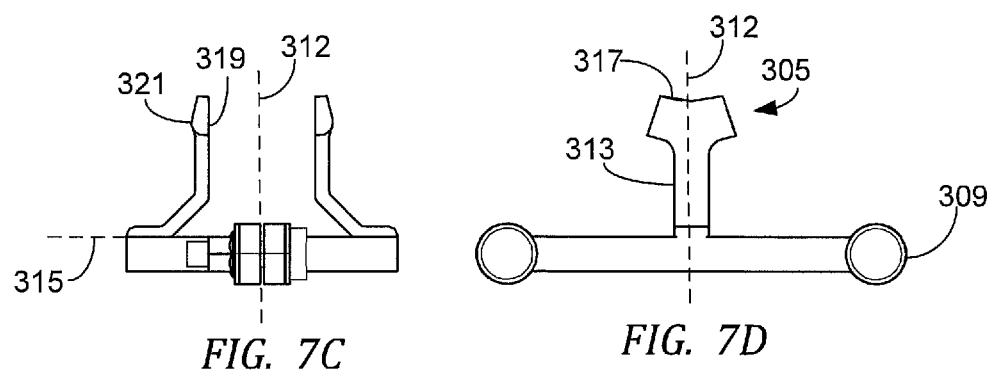
FIG. 7C is a side view of the anti-rotation device of FIG. 7A.
FIG. 7D is a front view of the anti-rotation clip of FIG. 7A.
Figure 7E:
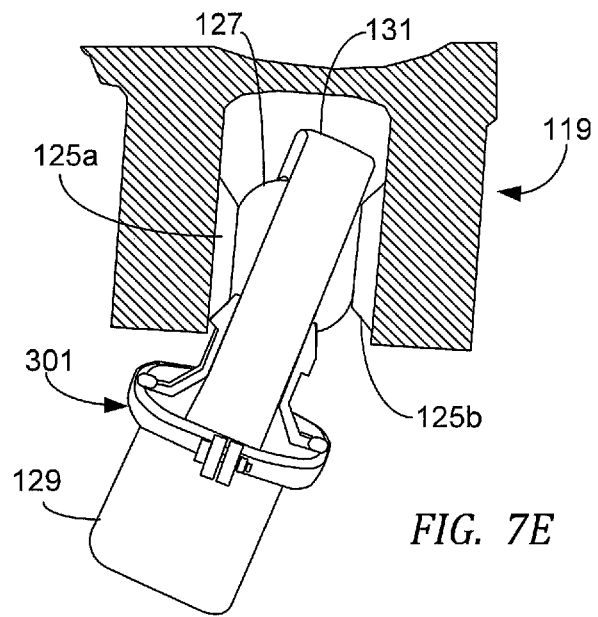
FIG. 7E is a perspective view of the anti-rotation clip of FIG. 7A installed around the actuator rod of FIG. 5C.

Referring specifically to FIG. 7E in the drawings, clip 301 is illustrated in conjunction with actuator rod 129. In prior embodiments described in this application, anti-rotation devices 12 were described as mating to non-rotating swashplate 111. Clip 301 is configured to mate directly to actuator rod 129. Clip 301 rotates with actuator rod 129 as pilot inputs direct actuator rods 129 to move. When actuator rod 129 rotates excessively, restraining member 305 is configured to act as a wedge between bearing housing 131 and bushings 125a and 125b. Restraining member 305 is configured to prevent excessive rotation of actuator rod 129 without limiting misalignment capability of actuator rod 129. 305 are positioned along bearing housing 131. The size and shape of restraining member 305 is selected so as to permit maximum rotation angle β within clevis 119 while avoiding contact and premature wear of swashplate 111 and/or bearing housing 131.

Referring now also to FIGS. 8A-8E in the drawings, an alternate embodiment of the present application is illustrated. A clip 401 is another embodiment of anti-rotation device 12. Clip 401 is preferably made from Nylatron. However, the material composition of clip 401 could be any wear resistant material. Clip 401 has the same purposes, limitations, functions and features of the previous embodiments, therefore all such purposes, limitations, functions and features are incorporated herein except as described below. Clip 401 can be easily installed during original installation and easily replaced during periodic maintenance periods.

Clip 401 is preferably a unitary piece of material. Clip 401 has two internal flanges 403 and two external flanges 405 that extend from a base member 407. Flanges 403, 405 are integrally coupled to base member 407. Flanges 403, 405 are configured to extend perpendicularly from an inner surface 409 of base member 407. External flange 405 extends from an end portion of base member 407. Internal flange 403 extends from an internal portion of base member 407. Internal portion refers to any point along base member 407 between external flanges 405. Internal flanges 403 form a cavity for acceptance of bearing housing 131. A plane 411 exists within the cavity equidistant from internal flanges 403. Plane 411 represents a plane of symmetry for clip 401. Flanges 403, 405 are further differentiated from each other by the location respective to plane 411. For example, external flange 405, to the left of plane 411, is left external flange 405a while the other is right external flange 405b. Likewise, there exists left internal flange 403a and right internal flange 403b. External flange 405a and 405b have an inner surface 417a and 417b, respectively. Similarly, internal flange 403a and 403b have an outer surface 419a and 419b, respectively.

Inner and outer surfaces 417a, 417b, 419a, 419b form relatively parallel planar surfaces with respect to one another. The planar orientation is configured to coincide with the shape and contour and clevis arm 117a and 117b. Clip 401 is configured to accept clevis arm 117a between inner surface 417a and outer surface 419a. Furthermore, clip 401 is configured to accept clevis arm 117b between inner surface 417b and outer surface 419b.

External flanges 405 are configured to include an aperture 413. Apertures 413 in external flanges 405 are concentrically aligned along an axis 415. Axis 415 is concentric to connecting pin 133 and perpendicular to surfaces 417a, 417b, 419a, 419b. Although described as having relative orientations, it is understood that other embodiments of clip 401 may vary the alignment of surfaces 417a, 417b, 419a, 419b so as to not be parallel. Likewise, axis 415 may be configured, such that axis 415 is not perpendicular to surfaces 417a, 417b, 419a, 419b. Clip 401 is configured to align with the geometric contours of non-rotating swashplate 111. Aperture 413 has a vertical axis 414 extending parallel to inner surface 409. Vertical axis 414 helps to define a plane passing through the center of apertures 123a in clevis arm 117a and the corresponding aperture in clevis arm 117b, bushings 125a and 125b, and apertures 413 in external flange 405.

Internal flange 403a is configured to have an upper leg 421a and a lower leg 423a. Upper leg 421a and lower leg 423a form a relatively semi-circular arc shape extending away from surface 409. Legs 421a, 423a are shaped and sized to surround a portion of bushing 125a on clevis arm 117a. Similarly, internal flange 403b has an upper leg 421b and a lower leg 423b. The limitations, functions, and features of legs 421a and 423a apply equally to that of legs 421b and 423b respecting bushing 125b within clevis arm 117b. The configuration of clip 401, as stated above, surrounds bearing housing 131 from a position exterior to clevis 119. Legs 421a, 423a, 421b, 423b are configured not to extend around bushings 125a and 125b beyond the plane generated by axis 414. This configuration allows clip 401, and more particularly internal flanges 403, to slide around bushings 125a and 125b. Internal flanges 403 are positioned along base member 407 so as to contact both clevis 117a and 117b on surfaces 419a, 419b when clip 401 is installed.

Figure 8A:
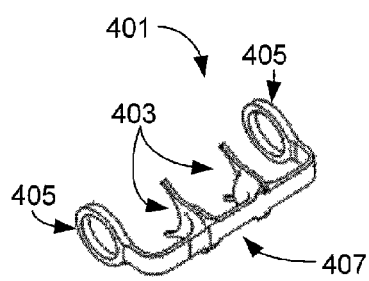
FIG. 8A is a perspective view of an alternate embodiment of the anti-rotation device of FIG. 4A.
Figure 8B:
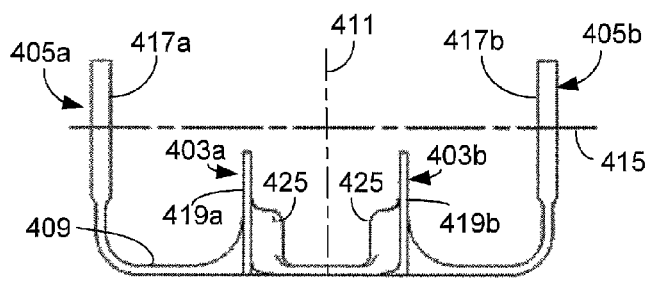
FIG. 8B is a top view of the anti-rotation clip device of FIG. 8A.
Figure 8C:
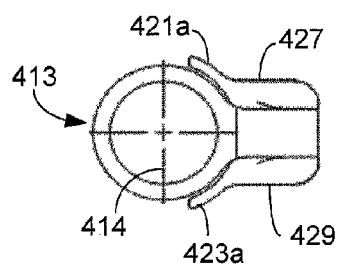
FIG. 8C is a side view of the anti-rotation device of FIG. 8A.
Figure 8D:
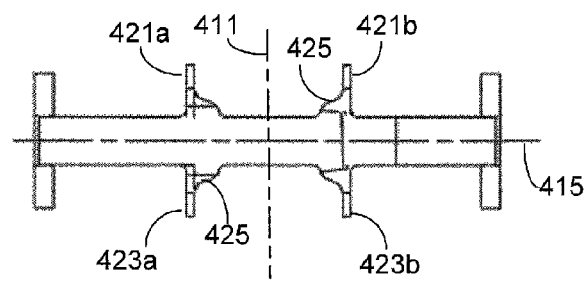
FIG. 8D is a front view of the anti-rotation clip of FIG. 8A.
Figure 8E:
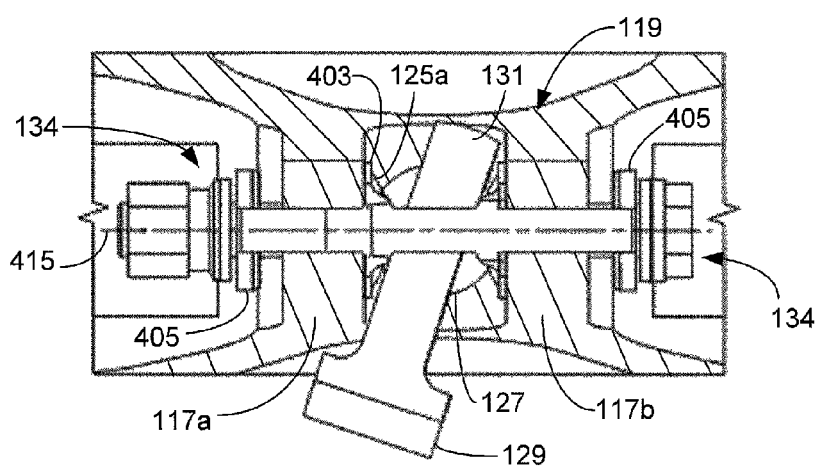
FIG. 8E is a front view of the anti-rotation clip of FIG. 8A installed in the clevis of FIG. 5A.

Clip 401 is configured to extend across a front face 137 of clevis 119, as seen in FIG. 8E. Clip 401 is configured to couple to non-rotating swashplate 111 with the use of existing hardware 134 used to secure bearing 127 within clevis 119, and an adhesive, such as a silicone adhesive. Connecting pin 133 and associated hardware 134 are used in conjunction with external flanges 405 to secure clip 401 to clevis 119. In practice, connecting pin 133 passes through apertures 413 in external flanges 405 as connecting pin is inserted through aperture 123a in clevis arm 117a and the corresponding aperture in clevis arm 117b. Existing hardware 134 is tightened so as to clamp around apertures 413. Internal flanges 403 are configured to mate with clevis arms 117a and 117b. Outer surface 419a, 419b and configured to contact clevis arm 117a, 117b, respectively, and be bonded by an adhesive, such as a silicone adhesive. The use of adhesive and existing fasteners 134 help to prevent rotation of clip 401 about front face 137.

Restraining members 425 are integrally formed within clip 401 between internal flanges 403. Restraining members 425 are similar in form and function to that of restraining members 97. The features, limitations, and functions of restraining member 97 apply equally to restraining member 425 except as described herein. Restraining member 425 extends between a top surface 427 and a bottom surface 429 of internal flanges 403. Restraining members 425 are typically rectangular and oriented in a predominantly vertical alignment. A vertical alignment allows restraining member 425 to maintain a relatively broad profile and increase surface contact with bearing housing 131. This vertical alignment minimizes premature wearing of bearing housing against restraining member 425.

Although generally rectangular in cross section, the shape of restraining member 425 could vary according to the application in which the apparatus is used. It is understood that restraining member 425 is not limited in size or shape to that depicted in the drawings. For example, restraining member 425 may extend as one continuous arc from top surface 427 to bottom surface 429. Furthermore, it is understood that one or more restraining members 425 may be used on each internal flange 403. The location of restraining member 425 is selected in order to most effectively limit the rotational freedom of actuator rod 129 without limiting misalignment capability of actuator rod 129.

Restraining member 425 extends inwardly from internal flange 403 toward plane 411 leaving a sufficient space to accept bearing housing 131. Clip 401 is configured so as to restrain the excessive movements of actuator rod 129 as described with clip 65. Restraining members 425 contact a portion of bearing housing 131 opposite that of clip 65, namely exterior to clevis 119 along the plane formed by axis 415 and axis of symmetry 135. Restraining member 425 extends on both sides of bearing housing 131. It is understood that some embodiments may wrap restraining member 425 around inner surface 409 of base member 407 between internal flanges 403, so as to create one continuous restraining member 425. In this embodiment, clip 401 may be oriented with respect to clevis 119 in various directions. For example, clip 401 may be rotated about the ends of clevis 119.

Restraining member 425 has a broad profile configured to avoid localized wearing of bearing housing 131 from the introduction of foreign abrasive matter and grease collecting on restraining member 425. As actuator rod 129 is rotated, restraining member 425 contacts portions of bearing housing 131 to limit excessive rotation that may lead to clevis 119 contacting bearing housing 131. It is understood that Clip 401 may be used in conjunction with other clips described within this application. Furthermore, it is understood that clips 65, 201, and 401 are independent of orientation, whether up or down.

Referring now also to FIG. 9A-9D in the drawings, an alternate embodiment of the present application is illustrated. A clip 501 is another embodiment of anti-rotation device 12. Clip 501 is preferably made from Nylatron. However, the material composition of clip 501 could be any wear resistant material. Clip 501 has the same purposes, limitations, functions and features of the previous embodiments, therefore all such purposes, limitations, functions and features are incorporated herein except as described below. Clip 501 can be easily installed during original installation and easily replaced during periodic maintenance periods. Furthermore, clip 501 may be installed on bearing housing 131 without the removal of actuator rod 129 from non-rotating swashplate 111.

Figure 9A:
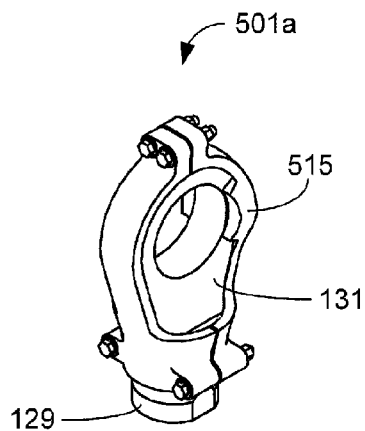
FIG. 9A is a perspective view of an alternate embodiment of the anti-rotation device of FIG. 4A installed over an actuator rod as seen in FIG. 5B, the anti-rotation device having a plurality of members, one member having restraining members.

Clip 501 is similar to that of clip 301 in that clip 501 is formed from a plurality of pieces and fastened directly to actuator rod 129 rather than to non-rotating swashplate 111. Clip 501 is formed from a set of fasteners 505 and two clip members 503, as denoted by clip member 503a and 503b. Each member 503a, 503b forms one half of clip 501. Members 503a, 503b are symmetrical about axis 507. Axis 507 is concentric with actuator rod 129 and axis 136. Clip 501 is configured to be installed around bearing housing 131 without removal of actuator rod 129 from non-rotating swashplate 111. Because members 503a and 503b are symmetric about axis 507, discussion of the features of member 503a will be presented. It is understood that the features of member 503a will be equally applied to member 503b. Furthermore, other embodiments of clip 501 may permit members 503 to be non-symmetric as seen in FIG. 9A.

Member 503a is formed to accept a portion of actuator rod 129 and specifically bearing housing 131, thereby forming a portion of a cavity 504. Member 503a has an inner surface 511a configured to contact bearing surface 139 and actuator surface 141. The contour of inner surface 511a is configured align with the contour of bearing surface 139 and actuator surface 141 such that surface 511a is in continuous contact with surfaces 139 and 141. It is understood that the contours of inner surface 511a and/or inner surface 511b of member 503b are not required to be identical. Furthermore, members 503 may contact and mate with additional surfaces of bearing housing 131 and/or actuator 129 than those depicted and described.

A tab 509 is located at the apex of member 503a, as seen with upper tab 509a, and a tab 509 is located at a bottom portion of member 503a, as seen with lower tab 509b. Each tab has at least one aperture 508 configured for acceptance of a fastener 505. Corresponding tabs 509c, and 509d are found with member 503b. Tabs 509 extend a distance away from inner surface 511a so as to permit fastener 505 to avoid penetration of surface 511a. Tabs 509 are integrally formed within member 503a. A tab surface 513a and 513b form a tabular plane parallel to that of axis 507. It is understood that other embodiments may permit surfaces 513a and 513b to be in separate planes.

Although described as locating tabs 509 in respective locations, it is understood that any number of tabs and/or fasteners may be used and located to secure member 503a to bearing housing 131 and actuator rod 129. Furthermore, other types of fasteners 505 may be used than depicted. For example, fasteners 505 such as clamps, bands, clips, or pins, may be used as well. If such alternate fasteners are used, it is understood that apertures 508 are optional within member 503a. Member 503a may have any number of ribs, tracks, knobs, or slots to aid in fastening members 503a and 503b together.

Member 503a has a restraining member 515 located on each side 517 and 519 of member 503a. Restraining member 515 is integrally formed with member 503a. Each restraining member 515a, 515b extends away from respective sides 517 and 519 a distance D, thereby forming a bulbous contour. The contour of restraining members 515a, 515b are configured to include the same features and functions as that described with restraining members 97 and 425 described above. The contour of restraining members 515a and 515b may vary. For example, restraining members 515a and 515b may extend from sides 517, 519 any distance D. Distance D may be sized to extend restraining member 515 to operate with restraining members 97 and/or 425. Likewise, distance D may be sized to extend restraining member 515 to operate directly with clevis arms 117a and 117b. The ability to manufacture restraining members 515 with any distance D allows clip 501 to be used with or without additional clips described above. Furthermore, other embodiments of clip 501 may permit clip 501 to engage with previously disclosed clips 65, 201, 301, 401 aside from restraining members 97, 425, 515.

Figure 9B:
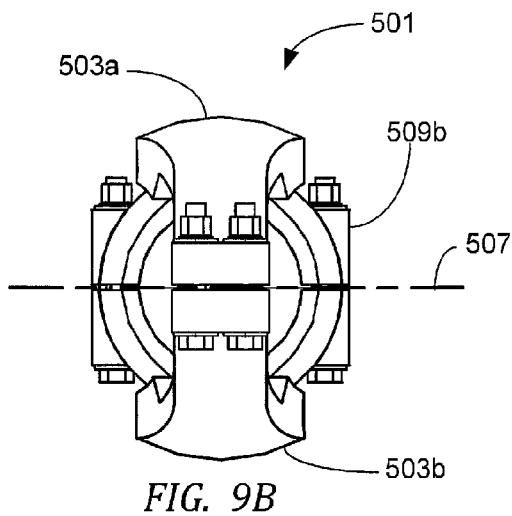
FIG. 9B is a top view of an alternate embodiment of the anti-rotation clip device of FIG. 9A, each member having restraining members.
Figure 9C:
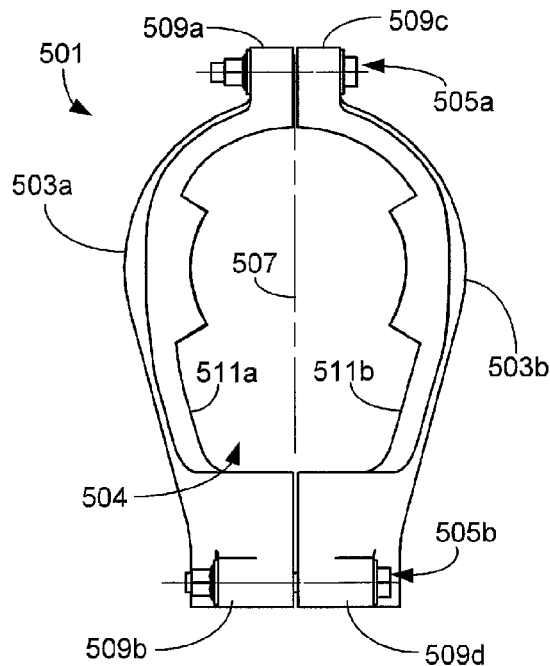
FIG. 9C is a side view of the anti-rotation device of FIG. 9B.
Figure 9D:
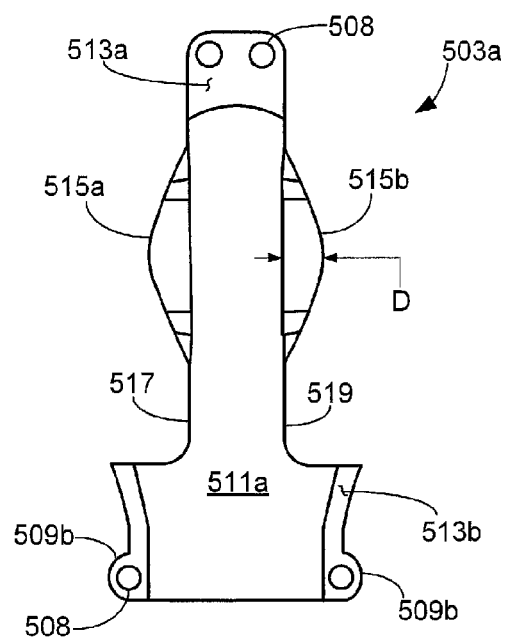
FIG. 9D is a front view of one member of the anti-rotation clip of FIG. 9C taken along a tabular plane.

As noted previously, discussion regarding the features, functions, and limitations of member 503a is equally applicable to that of member 503b. In this embodiment of clip 501, members 503 are formed to be symmetric about axis 507. The symmetric feature of members 503 allow for simplified manufacturing and the ability to interchange portions of clip 501 when worn or damaged rather than replacing the entire clip 501. FIGS. 9B and 9C depict clip 501 where each member 503a and 503b are symmetric and include identical features. Clip 501 has the added advantage that when member 503a is worn, clip 501 may be removed and rotated such that members 503a and 503b interchange places. It is understood that symmetry and identical features between members 503a and 503b are not required. For example, FIG. 9A depicts an alternative embodiment of clip 501, namely clip 501a, wherein only one member includes restraining member 515.

To install, member 503a is inserted within clevis 119, between bearing housing 131 and surface 121 of clevis 119. Inner surface 511a is brought into contact with surfaces 139 and 141. Member 503b is positioned such that inner surface 511b is brought into contact with surfaces 139 and 141. Members 503a and 503b are aligned so as to permit fastening by fasteners 505. Clip 501 is bonded to surfaces 139 and 141 by the use of an adhesive, such as silicone. All mating surfaces 511a, 511b, 139, 141 are bonded together. Other embodiments may vary the amount or locations of surfaces that receive adhesive. Tab surfaces 513a, 513b may be bonded by adhesive as well. When members 503a and 503b are installed around bearing housing 131 and actuator rod 129, clip 501 forms a hooded layer around bearing surface 139 and actuator surface 141.

It should be understood that the present invention is not limited to uses on helicopters and tilt rotor aircraft, but also includes uses on any aircraft using rotating control systems. Additionally, clips 65, 201, 301, 401, 501 can be used in any application to limit the rotation of an actuator, rod or linkage that is attached between two clevis arms. Furthermore, although describes as being composed of multiple pieces, it is understood that clip 501 may be a unitary clip of one member. For example, upper tab 509a, 509c may be removed thereby integrally joining member 513a and 513b at the apex of bearing housing 131. To install, clip 501 would deform and extend over bearing housing 131. Clip 501 would couple to actuator rod 129 by the use of fasteners 511 in lower tabs 509b, 509d.

The current application has many advantages over the prior art including the following: (1) preventing premature wear of the bearing housing or non-rotating swashplate; (2) removably coupled to the non-rotating swashplate or the actuator rod; (3) configured for simplified manufacturing; (4) the ability to install during original installation and easily replaced during periodic maintenance periods; (5) the ability to install without removal of flight critical or other systems on the aircraft; and (6) the ability to fasten to non-rotating swashplate with existing fasteners The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A rotating control system, comprising:
   a member having at least one clevis defined by a pair of clevis arms having a pair of aligned holes;
   a spherical bearing disposed between the pair of clevis arms and having a through hole aligned with the clevis arm holes;
   a connecting in extending through the spherical bearing through hole and the clevis arm holes;
   a shaft member comprising an actuator rod and a bearing housing disposed at an end of the actuator rod and having a through hole defining a cavity pivotally receiving the spherical bearing between the pair of clevis arms, the shaft member having a rod axis concentrically extending along the actuator rod and a pivot axis concentrically extending through the bearing housing cavity; and
   an anti-rotation device for limiting a rotation of the shaft member about the rod axis, the anti-rotation device comprising a multi-piece clip having two clip members which are symmetrical about a plane containing the rod axis and the pivot axis, each clip member comprising:
   a collar portion configured to wrap around a portion of the actuator rod;
   a ring portion defining a cavity configured to wrap around a portion of the bearing housing and concentric with the pivot axis; and
   at least one restraining member that extends from a side of the ring portion toward the clevis arms for limiting the rotation of the shaft member about the rod axis, and wherein the at least one restraining member has an inner surface having a concave spherical shape for receiving the spherical bearing and an outer surface having a bulbous shape relative to the plane of symmetry of the clip members;

wherein the clip members have a plurality of aligned apertures for coupling the clip members around the shaft member; and wherein at least one aperture is located at an apex of the anti-rotation device.

2. The rotating control system of claim 1, wherein the anti-rotation device couples to the shaft member using at least one of a fastener and an adhesive.

3. The rotating control system of claim 2, wherein the apertures are configured to accept a fastener to secure the anti-rotation device to the shaft member.

4. The rotating control system of claim 1, wherein the anti-rotation device is configured to couple to the shaft member without removal of the shaft member.

5. The rotating control system of claim 1, wherein the anti-rotation device is configured to allow worn or damaged portions of the anti-rotation device to be interchanged, thereby avoiding the replacement of the entire anti-rotation device.

6. The rotating control system of claim 1, further comprising:
   a bushing disposed with each clevis arm hole;
   wherein the restraining member has a plurality of surfaces contoured to accept the spherical bearing and the bushings as the shaft member is rotated; and
   wherein the spherical bearing and the bushings are operably coupled to the clevis.

\* \* \* \* \*